United States Patent
Fukasawa et al.

(10) Patent No.: US 11,817,774 B2
(45) Date of Patent: Nov. 14, 2023

(54) CONTROL DEVICE FOR POWER CONVERTER

(71) Applicant: TOSHIBA MITSUBISHI-ELECTRIC INDUSTRIAL SYSTEMS CORPORATION, Chuo-ku (JP)

(72) Inventors: Issei Fukasawa, Tokyo (JP); Masahiro Kinoshita, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 331 days.

(21) Appl. No.: 17/416,878

(22) PCT Filed: Dec. 10, 2019

(86) PCT No.: PCT/JP2019/048333
§ 371 (c)(1),
(2) Date: Jun. 21, 2021

(87) PCT Pub. No.: WO2021/117146
PCT Pub. Date: Jun. 17, 2021

(65) Prior Publication Data
US 2022/0140723 A1    May 5, 2022

(51) Int. Cl.
*H02M 1/32* (2007.01)
*H02M 1/00* (2006.01)
(Continued)

(52) U.S. Cl.
CPC ............... *H02M 1/32* (2013.01); *H02H 7/12* (2013.01); *H02M 1/0009* (2021.05); *H02M 7/48* (2013.01)

(58) Field of Classification Search
CPC ........ H02M 1/32; H02M 1/0009; H02M 7/48; H02H 7/12
See application file for complete search history.

(56) References Cited

U.S. PATENT DOCUMENTS

2016/0234922 A1*   8/2016   Tabata .................... H02M 7/48
2016/0261205 A1*   9/2016   Kolar ...................... H02M 1/32

FOREIGN PATENT DOCUMENTS

JP          9-28040 A       1/1997
JP       2005-204485 A      7/2005
(Continued)

OTHER PUBLICATIONS

International Search Report dated Mar. 3, 2020 in PCT/JP2019/048333 filed on Dec. 10, 2019(2 pages).
(Continued)

*Primary Examiner* — Adolf D Berhane
*Assistant Examiner* — Afework S Demisse
(74) *Attorney, Agent, or Firm* — Oblon, McClelland, Maier & Neustadt, L.L.P.

(57) ABSTRACT

A control device for a power converter that can suppress oscillation of an output voltage of the power converter. The control device for the power converter includes an overvoltage detector configured to detect an overvoltage on an output side of the power converter and a controller configured to, when the overvoltage on the output side of the power converter is detected by the overvoltage detector, perform gate block after reducing a current command value given to the power converter. With the configuration, when the overvoltage on the output side of the power converter is detected, the control device performs the gate block after reducing the current command value given to the power converter. Accordingly, it is possible to suppress oscillation of an output voltage of the power converter.

2 Claims, 3 Drawing Sheets

(51) Int. Cl.
*H02H 7/12* (2006.01)
*H02M 7/48* (2007.01)

(56) References Cited

FOREIGN PATENT DOCUMENTS

JP 2007-325333 A 12/2007
JP 2010-246228 A 10/2010

OTHER PUBLICATIONS

Office Action dated Jul. 12, 2022, in corresponding Indian Patent Application No. 202117025952 (with English Translation), 6 pages.
International Preliminary Report on Patentability and Written Opinion dated Jun. 23, 2022 in PCT/JP2019/048333 (with English Translation), 12 pages.

* cited by examiner

CONTROL DEVICE FOR POWER CONVERTER

FIELD

The present invention relates to a control device for a power converter.

BACKGROUND

Patent Literature 1 discloses a power conversion system. With the power conversion system, it is possible to interconnect with a system while suppressing a rush current.

CITATION LIST

Patent Literature

[PTL 1] JP H9-28040 A

SUMMARY

Technical Problem

In the power conversion system described in Patent Literature 1, however, when a system accident occurs during the operation of a power converter, an overvoltage may occur on an output side of the power converter. As a method of suppressing a failure due to application of the overvoltage, there is a method of detecting the overvoltage with an overvoltage detecting function of the power converter and performing gate block to stop the operation of the power converter. In the method, when the gate block is performed immediately after the detection of the overvoltage, an output voltage of the power converter may oscillate. In this case, an overvoltage may be further induced.

The present invention has been made in order to solve the problem described above. An object of the present invention is to provide a control device for a power converter that can suppress oscillation of an output voltage of the power converter.

Solution to Problem

A control device for a power converter according to the present invention includes: an overvoltage detector configured to detect an overvoltage on an output side of the power converter; and a controller configured to, when the overvoltage on the output side of the power converter is detected by the overvoltage detector, perform gate block after reducing a current command value given to the power converter.

Advantageous Effects of Invention

According to the present invention, when the overvoltage on the output side of the power converter is detected, the control device performs the gate block after reducing the current command value given to the power converter. Accordingly, it is possible to suppress oscillation of an output voltage of the power converter.

DESCRIPTION OF EMBODIMENTS

Figure 1:
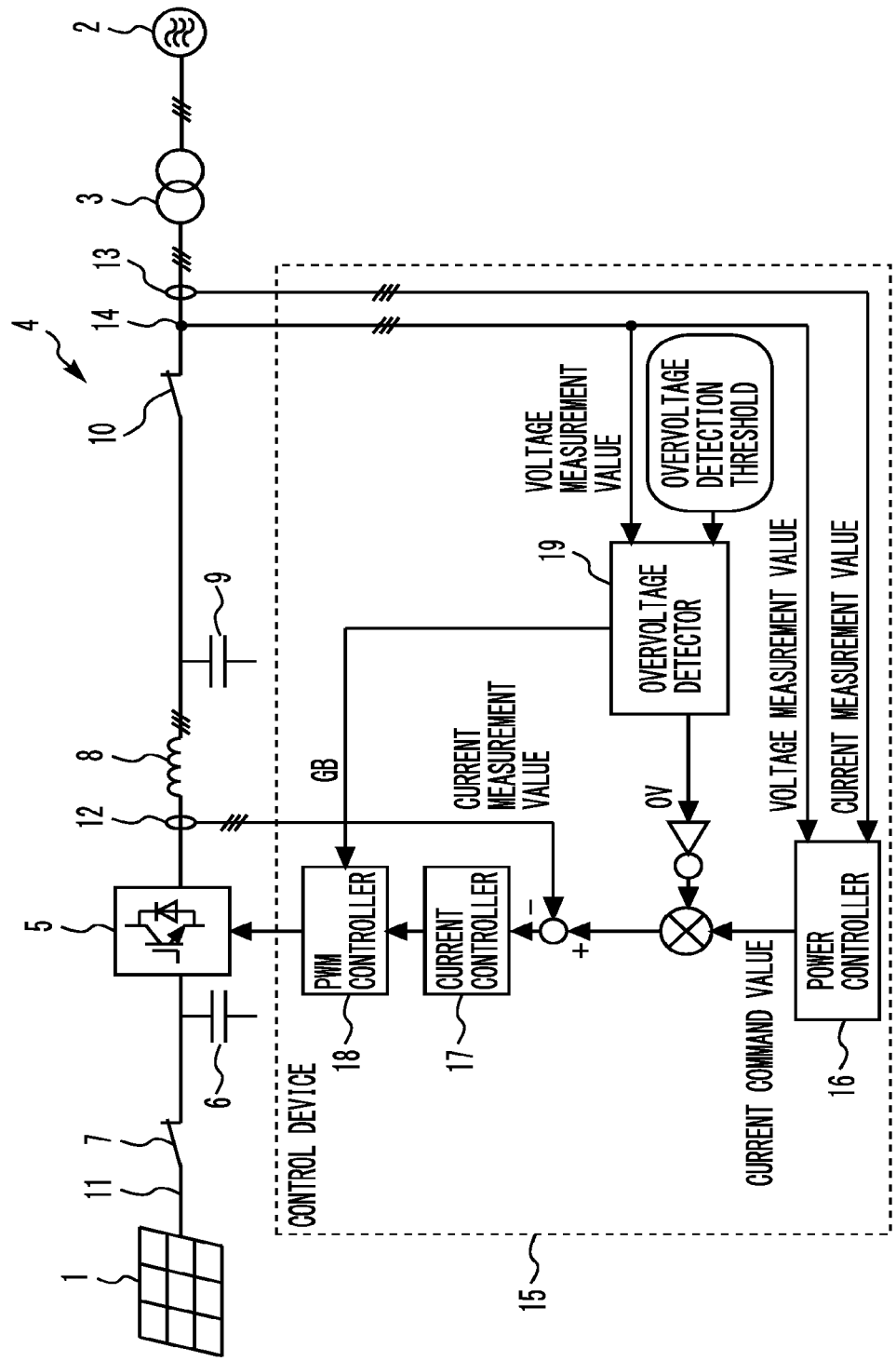
FIG. 1 is a configuration diagram of a power system to which a control device for a power converter in a first embodiment is applied.

A mode for carrying out the present invention is explained with reference to the accompanying drawings. Note that, in figures, the same or equivalent portions are denoted by the same reference numerals and signs. Repetitive descriptions of the portions are simplified or omitted as appropriate.

First Embodiment

FIG. 1 is a configuration diagram of a power system to which a control device for a power converter in a first embodiment is applied.

In FIG. 1, a DC power supply 1 is solar power generation equipment. An AC power supply 2 is of three phases and is operated by a power company or the like. A transformer 3 is connected between the DC power supply 1 and the AC power supply 2.

A power conversion system 4 includes a power converter 5, a DC capacitor 6, a DC switch 7, an AC reactor 8, an AC capacitor 9, an AC switch 10, a DC voltage detector 11, a first AC current detector 12, a second AC current detector 13, an AC voltage detector 14, and a control device 15.

The power converter 5 is connected between the DC power supply 1 and the transformer 3. The DC capacitor 6 is connected between the DC power supply 1 and the power converter 5. The DC switch 7 is connected between the DC power supply 1 and the DC capacitor 6. The AC reactor 8 is connected between the power converter 5 and the transformer 3. The AC capacitor 9 is connected between the transformer 3 and the AC reactor 8. The AC switch 10 is connected between the transformer 3 and the AC capacitor 9.

The DC voltage detector 11 is connected between the power converter 5 and the DC capacitor 6. The first AC current detector 12 is provided between the power converter 5 and the AC reactor 8. The second AC current detector 13 is provided between the transformer 3 and the AC switch 10. The AC voltage detector 14 is provided between the transformer 3 and the AC switch 10.

The control device 15 includes a power controller 16, a current controller 17, a PWM controller 18, and an overvoltage detector 19.

The power controller 16 outputs a current command value based on a current measurement value from the second current detector 13 and a voltage measurement value from the AC voltage detector 14. The current controller 17 outputs a voltage command value based on a deviation between the current command value from the power controller 16 and a current measurement value from the first AC current detector 12. The PWM controller 18 controls the power converter 5 based on the voltage command value from the current controller 17.

The overvoltage detector 19 compares the voltage measurement value from an AC-voltage detecting unit and a preset overvoltage detection threshold. When the voltage measurement value from the AC-voltage detector 14 is larger than the preset overvoltage detection threshold, the overvoltage detector 19 outputs information concerning an overvoltage detection flag for reducing the current command value to 0, As a result, the current command value is reduced to 0. Thereafter, when a certain time elapses, an overvoltage detector 19 outputs a gate block signal GB toward the PWM controller 18. The PWM controller 18 performs gate block based on the gate block signal GB.

Figure 2:
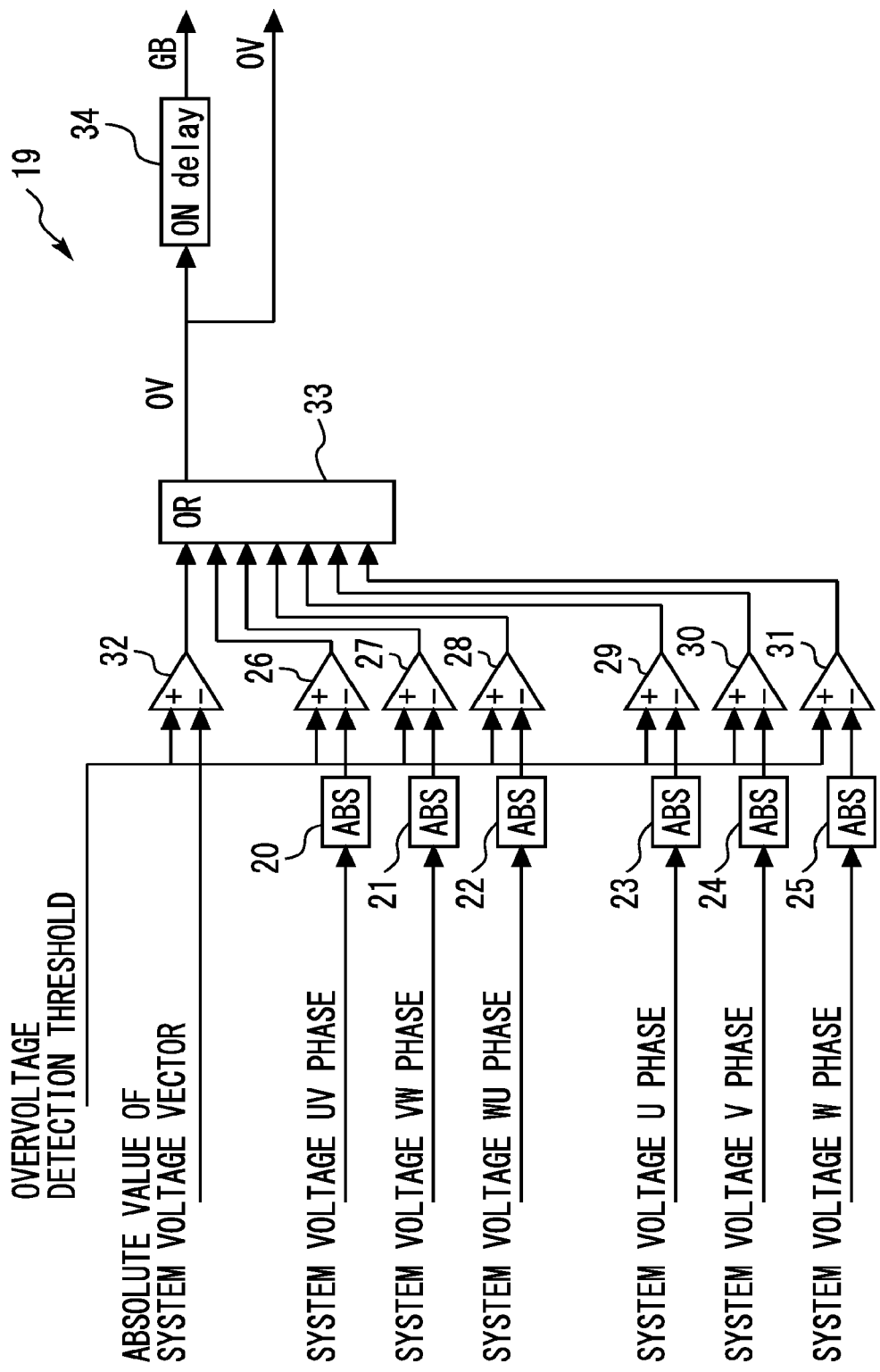
FIG. 2 is a block diagram showing an implementation example of an overvoltage detector provided in the control device for the power converter in the first embodiment.

Subsequently, an implementation example of the overvoltage detector 19 is explained with reference to FIG. 2. FIG. 2 is a block diagram showing an implementation example of an overvoltage detector provided in the control device for the power converter in the first embodiment.

As shown in FIG. 2, the overvoltage detector 19 includes a first absolute-value calculating unit 20, a second absolute-value calculating unit 21, a third absolute-value calculating unit 22, a fourth absolute-value calculating unit 23, a fifth absolute-value calculating unit 24, a sixth absolute-value calculating unit 25, a first comparing unit 26, a second comparing unit 27, a third comparing unit 28, a fourth comparing unit 29, a fifth comparing unit 30, a sixth comparing unit 31, a seventh comparing unit 32, an OR calculating unit 33, and a delay unit 34.

The first absolute-value calculating unit 20 calculates an absolute value of a difference (a system voltage UV phase) between voltages in a U phase and a V phase of a system. The second absolute-value calculating unit 21 calculates an absolute value of a difference (a system voltage VW phase) between voltages in the V phase and a W phase of the system. The third absolute-value calculating unit 22 calculates an absolute value of a difference (a system voltage WU phase) between voltages in the W phase and the U phase of the system.

The fourth absolute-value calculating unit 23 calculates an absolute value of a voltage (a system voltage U phase) in the U phase of the system. The se fifth absolute-value calculating unit 24 calculates an absolute value of a voltage a system voltage V phase in the V phase of the system. The sixth absolute-value calculating unit 25 calculates an absolute value of a voltage (a system voltage W phase) in the W phase of the system.

The first comparing unit 26 compares the calculated value of the first absolute-value calculating unit 20 and the preset overvoltage detection threshold. The second comparing unit 27 compares the calculated value of the second absolute-value calculating unit 21 and the preset overvoltage detection threshold. The third comparing unit 28 compares the calculated value of the third absolute-value calculating unit 22 and the preset overvoltage detection threshold.

The fourth comparing unit 29 compares the calculated value of the fourth absolute-value calculating unit 23 and the preset overvoltage detection threshold. The fifth comparing unit 30 compares the calculated value of the fifth absolute-value calculating unit 24 and the preset overvoltage threshold. The sixth comparing unit 31 compares the calculated value of the sixth absolute-value calculating unit 25 and the preset overvoltage detection threshold.

The seventh comparing unit 32 compares the absolute value of a voltage vector of the system and the preset overvoltage detection threshold.

The OR calculating unit 33 outputs an overvoltage detection flag OV for reducing a current command value to 0 when a value larger than the preset overvoltage detection threshold is detected by any one of the first comparing unit 26 to the seventh comparing unit 32.

By comparing not only the absolute value of the voltage vector but also line voltages and phase voltages with thresholds, even when output voltages are unbalanced, it is possible to quickly detect an overvoltage of the highest phase or line voltage.

By comparing both of the line and phase voltages with the thresholds, in both of the case in which a three-phase transformer connected to an output is a A-A connection and the case in which the three-phase transformer is a A-Y connection, it is possible to quickly detect an overvoltage on a secondary side of the transformer.

In the case of triphase equilibrium, by comparing the absolute value of the voltage vector with the threshold, in both the case in which the three-phase transformer connected to the output is the A-A connection and the case in which the three-phase transformer is the A-Y connection, it is possible to quickly detect an overvoltage on the secondary side of the transformer.

The delay unit 34 outputs the gate block signal GB after a certain time elapses from reception of an input of the overvoltage detection flag OV from the OR calculating unit 33.

As a result, the gate block is performed after the current command value is reduced to 0.

According to the first embodiment explained above, the control device 15 performs the gate block after reducing a current command value given to the power converter 5 when an overvoltage on an output side of the power converter 5 is detected. Accordingly, when an electric current reaches a value close to 0, the electric current is shut off. Therefore, compared with when the gate block is performed without reducing the current command value, it is possible to suppress oscillation of an output voltage of the power converter 5.

At this time, since the amplitude of the output voltage decreases, a device having a low withstand voltage can be selected as a device connected to the output side of the power converter 5. As a result, flexibility of setting of the device increases and cost of the device can be reduced.

Note that, when the DC power supply 1 is solar power generation equipment, in the control device 15, when an overvoltage on the output side of the power converter 5 is detected by the overvoltage detector 19, a cutoff frequency of a low-pass filter of the DC voltage detector 11 may be temporarily increases until the gate block is performed after the current command value given to the power converter 5 is reduced. In this case, even if a DC current from the solar power generation equipment suddenly decreases and a DC voltage suddenly rises, it is possible to prevent an AC voltage from rising because of a delay of the low-pass filter of the DC voltage detector 11.

The control device 15 in the first embodiment may be applicable to a power system in which power storage equipment is used as the DC power supply 1. In this case as well, it is possible to suppress oscillation of the output voltage of the power converter 5.

Subsequently, an example of the control device 15 is explained with reference to FIG. 3.

Figure 3:
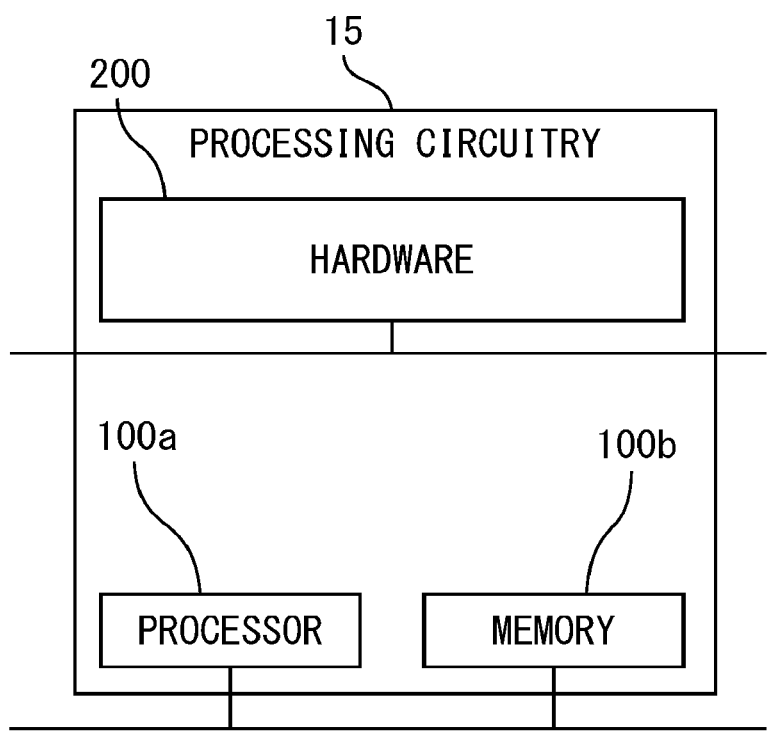
FIG. 3 is a hardware configuration diagram of the control device for the power converter in the first embodiment.

FIG. 3 is a hardware configuration diagram of the control device for the power converter in the first embodiment.

Functions of the control device 15 can be implemented by a processing circuitry. For example, the processing circuitry includes at least one processor 100a and at least one memory 100b. For example, the processing circuitry includes at least one kind of dedicated hardware 200.

When the processing circuitry includes the at least one processor 100a and the at least one memory 100b, the functions of the control device 15 are implemented by software, firmware, or a combination of the software and the firmware. At least one of the software and the firmware is described as a program. At least one of the software and the firmware is stored in the at least one memory 100b. The at least one processor 100a reads and executes the program stored in the at least one memory 100b to thereby realize the functions of the control device 15. The at least one processor 100a is referred to as central processing unit, processing unit, arithmetic unit, microprocessor, microcomputer, or DSP as well. For example, the at least one memory 100b is a nonvolatile or volatile semiconductor memory such as a RAM, a ROM, a flash memory, an EPROM, or an EEPROM, a magnetic disk, a flexible disk, an optical disk, a compact disk, a mini disk, a DVD, or the like.

When the processing circuitry includes the at least one kind of dedicated hardware 200, the processing circuitry is implemented by a single circuit, a composite circuit, a programmed processor, a parallel-programed processor, an ASIC, an FPGA, or a combination of the single circuit, the composite circuit, the programmed processor, the parallel-programed processor, the ASIC, and the FPGA. For example, the functions of the control device 15 are each implemented by processing circuitries. For example, the functions of the control device 15 are collectively implemented by a processing circuitry.

A part of the functions of the control device 15 may be implemented by the dedicated hardware 200 and the other part of the functions of the control device 15 may be implemented by software or firmware. For example, a function of the overvoltage detector 19 may be implemented by a processing circuitry functioning as the dedicated hardware 200 and functions other than the function of the overvoltage detector 19 may be implemented by the at least one processor 100a reading and executing the program stored in the at least one memory 100b.

In this way, the processing circuitry realizes the functions of the control device 15 with the hardware 200, the software, the firmware, or a combination of the hardware 200, the software, and the firmware.

INDUSTRIAL APPLICABILITY

As explained above, the control device for the power converter according to the present invention can be used in the system that suppresses oscillation of the output voltage of the power converter.

REFERENCE SIGNS LIST

1 DC power supply
2 AC power supply
3 Transformer
4 Power conversion system
5 Power converter
6 DC capacitor
7 DC switch
8 AC reactor
9 AC capacitor
10 AC switch
11 DC voltage detector
12 First AC current detector
13 Second AC current detector
14 AC voltage detector
15 Control device
16 Power controller
17 Current controller
18 PWM controller
19 Overvoltage detector
20 First absolute-value calculating unit
21 Second absolute-value calculating unit
22 Third absolute-value calculating unit
23 Fourth absolute-value calculating unit
24 Fifth absolute-value calculating unit
25 Sixth absolute-value calculating unit
26 First comparing unit
27 Second comparing unit
28 Third comparing unit
29 Fourth comparing unit
30 Fifth comparing unit
31 Sixth comparing unit
32 Seventh comparing unit
33 OR calculating unit
34 Delay unit
100a Processor
100b Memory
200 Hardware

The invention claimed is:

1. A control device for a power converter comprising:
an overvoltage detector configured to detect an overvoltage on an output side of the power converter; and
a controller configured to, when the overvoltage on the output side of the power converter is detected by the overvoltage detector, perform gate block after reducing a current command value given to the power converter,
the overvoltage detector detecting the overvoltage on the output side of the power converter connected between solar power generation equipment and an AC power supply, and
when the overvoltage on the output side of the power converter is detected by the overvoltage detector, before reducing the current command value given to the power converter, the controller temporarily increasing a cutoff frequency of a low-pass filter of a DC voltage detector provided between the solar power generation equipment and the power converter.

2. The control device for the power converter according to claim 1, further comprising means for comparing at least two of an absolute value of a system voltage, a phase voltage, and a line voltage with a predetermined threshold and detecting the overvoltage.

* * * * *